(12) United States Patent
Ramesh et al.

(10) Patent No.: US 11,181,030 B2
(45) Date of Patent: Nov. 23, 2021

(54) METHODS FOR MAKING AND USING SCR CATALYST ON-BOARD DIAGNOSTIC LIMIT PARTS

(71) Applicant: PACCAR Inc, Bellevue, WA (US)

(72) Inventors: Varun Ramesh, Bellingham, WA (US); Isaac Stark, Bellingham, WA (US)

(73) Assignee: PACCAR Inc, Bellevue, WA (US)

( * ) Notice: Subject to any disclaimer, the term of this patent is extended or adjusted under 35 U.S.C. 154(b) by 295 days.

(21) Appl. No.: 16/525,262

(22) Filed: Jul. 29, 2019

(65) Prior Publication Data

US 2021/0033015 A1 Feb. 4, 2021

(51) Int. Cl.
*F01N 11/00* (2006.01)
*B01D 53/94* (2006.01)
*F01N 3/20* (2006.01)

(52) U.S. Cl.
CPC .......... *F01N 11/00* (2013.01); *B01D 53/9418* (2013.01); *B01D 53/9495* (2013.01); *F01N 3/2066* (2013.01); *F01N 2550/02* (2013.01); *F01N 2560/026* (2013.01); *F01N 2900/1621* (2013.01)

(58) Field of Classification Search
CPC .................. F01N 11/00; F01N 3/2066; F01N 2900/1621; F01N 2560/026; F01N 2550/02; F01N 2900/1402; F01N 2900/0416; B01D 53/9418; B01D 53/9495; Y02T 10/12; Y02T 10/40
See application file for complete search history.

(56) References Cited

U.S. PATENT DOCUMENTS

| | | | | |
|---|---|---|---|---|
| 8,402,755 | B2 * | 3/2013 | Sengar | B01D 53/8631 60/299 |
| 9,327,282 | B2 * | 5/2016 | Yezerets | F01N 3/206 |
| 9,528,420 | B2 | 12/2016 | Liu et al. | |
| 2010/0043397 | A1 | 2/2010 | Wang et al. | |
| 2010/0083636 | A1 * | 4/2010 | Wang | F01N 11/00 60/277 |

FOREIGN PATENT DOCUMENTS

FR 3 052 369 A1 12/2017
WO 2015/094199 A1 6/2015

* cited by examiner

*Primary Examiner* — Brandon D Lee
(74) *Attorney, Agent, or Firm* — Seed IP Law Group LLP

(57) ABSTRACT

A method of manufacturing an on-board diagnostic (OBD) limit part and a method of testing to evaluate an OBD system. The method of manufacturing the OBD limit part includes introducing a contaminant to an selective catalytic reduction (SCR) catalyst and contacting the contaminant with the SCR catalyst for a selected period of time. The method of manufacturing utilizes a vessel, the contaminant, and the SCR catalyst. The OBD limit part is a combination of the contaminant and the SCR catalyst within the vessel. The method of testing to evaluate the OBD system includes collecting data related to an exhaust gas before and after the exhaust gas is exposed to the OBD limit part, collecting an indication provided by the OBD system, and comparing the data related to the exhaust gas and the indication provided by the OBD system. The method of testing to evaluate the OBD system utilizes a system that includes an exhaust gas source, a first and a second fluid path, the OBD limit part, and the OBD system.

8 Claims, 5 Drawing Sheets ents a controlled amount of contaminant is introduced to the SCR catalyst. In other embodiments, the contaminant is contacted with the SCR catalyst for a preselected period of time.

METHODS FOR MAKING AND USING SCR CATALYST ON-BOARD DIAGNOSTIC LIMIT PARTS

BACKGROUND

Technical Field

The present disclosure is directed to on-board diagnostic (OBD) limit parts, methods of manufacturing the OBD limit parts, and methods of using these OBD limit parts to evaluate SCR systems and OBD systems for SCR systems.

Description of the Related Arts

As requirements and demands to reduce emissions of vehicles and trucks within the vehicle and truck industries increase, manufacturers face significant challenges to meet standards, parameters, and testing requirements set by governmental entities, such as reducing greenhouse gases or reducing nitrogen oxide ($NO_x$) emissions from engines through the use of Exhaust Aftertreatment Systems (EAS). One such EAS utilizes a Selective Catalytic Reduction (SCR) catalyst that converts nitrogen oxides ($NO_x$) into nitrogen ($N_2$) and water ($H_2O$). Often, when the EAS is in use, an On-Board Diagnostic (OBD) system observes and assesses whether the SCR catalyst is working within certain parameters and standards. If the OBD system determines that the SCR catalyst is not functioning within these parameters and standards, then the SCR catalyst must be replaced. On the other hand, if the OBD system determines that the SCR catalyst is functioning within the parameters and standards, then the SCR catalyst does not need to be replaced. However, there are situations when OBD systems may provide an indication that the SCR catalyst of the EAS is functioning within the proper parameters and standards, even though the SCR catalyst is not actually functioning within the parameters and standards. In order to reduce the likelihood of this outcome, OBD systems used to observe and assess SCR catalysts within EASs must be tested before an engine with EASs will be certified and allowed to be used on the road.

OBD regulations generally require the use of a deteriorated catalyst, which can be represented by an OBD limit part discussed below, to represent real world catalyst deterioration under normal and malfunctioning engine operating conditions. The OBD limit part is used to replicate catalyst malfunction criteria. In order to meet the OBD regulations, correlation data for real world failures must be supplied to show that the OBD limit parts used in the testing of the OBD system are representative of real world failures and that the OBD system will detect these real world failures when an engine is in use.

Another known example of manufacturing limit parts can be found in U.S. Pat. No. 9,528,420. In this manufacturing process a SCR substrate is thermally aged and chemically deteriorated to provide a limit part intended to be representative of a failing SCR catalyst. These limit parts are expensive and require long ordering lead times.

BRIEF SUMMARY

The present disclosure is directed to On-Board Diagnostic (OBD) limit parts, methods of manufacturing the OBD limit parts, and methods of using the OBD limit parts to evaluate Selective Catalytic Reduction (SCR) systems and OBD systems for SCR systems.

Embodiments of the described methods of manufacturing OBD limit parts generally include introducing a contaminant to an SCR catalyst and contacting the SCR catalyst with the contaminant for a selected period of time. In certain embodiments a controlled amount of contaminant is introduced to the SCR catalyst. In other embodiments, the contaminant is contacted with the SCR catalyst for a preselected period of time.

In one embodiment of a method of manufacturing OBD limit parts, the controlled amount of contaminant that the SCR catalyst is introduced to and kept in contact with for a preselected period of time is a coolant. The coolant may be a coolant used to cool one or more, or both, an engine and an exhaust gas recirculation system (EGR). The coolant helps keep the diesel engine running at an appropriate temperature to avoid the diesel engine from overheating and can be used to cool exhaust gases from the EGR system that are recirculated back to the engine.

Generally speaking, an SCR catalyst is used in an Exhaust Aftertreatment System (EAS) to reduce greenhouse gases or other emissions that are output by an engine. For example, the SCR catalyst is exposed to an exhaust gas from a diesel engine to remove nitrogen oxides ($NO_x$) from the exhaust gas.

In accordance with embodiments of the present disclosure for manufacturing OBD limit parts, an SCR catalyst is contacted with a coolant for a selected period of time. In certain embodiments, the period of time for contacting the SCR catalyst with the coolant is about 56 hours. However, in other alternative embodiments, the period of time that the SCR catalyst is contacted with the coolant is more or less than about 56 hours. These OBD limit parts can then be used to evaluate an OBD system for its ability to diagnose SCR system performance or to evaluate the ability of an SCR system to convert $NO_x$ to nitrogen and water.

In accordance with embodiments of the present disclosure directed to methods of evaluating the ability of an SCR system to convert $NO_x$ to nitrogen and water, OBD limit parts of the present disclosure are placed in a vessel which is coupled to an exhaust gas source. The exhaust gas source may be a diesel engine, a non-diesel engine, or some other type of exhaust gas source. In accordance with these embodiments, first data related to $NO_x$ in the exhaust gas prior to introducing the exhaust gas into the vessel is collected and second data related to $NO_x$ in the exhaust gas after the exhaust gas has passed through the vessel is collected. The collected second data is compared to a threshold standard and the ability of the SCR system to convert $NO_x$ to nitrogen and water is evaluated based on a result of the comparison of the second data to the threshold standard.

In other embodiments of the present disclosure, an OBD system is coupled to a first location before an exhaust gas from the exhaust gas source passes through the vessel containing the OBD limit part and is coupled to a second location after the exhaust gas passes through vessel containing the OBD limit part. Emissions data is collected with respect to the exhaust gas before the exhaust gas is exposed to the OBD limit part and after the exhaust gas is exposed to the OBD limit part. The emissions data is compared to a threshold value and the SCR catalyst of the OBD limit part is evaluated to determine if the SCR catalyst of the OBD limit part is functioning within the proper parameters and standards or is functioning outside of the proper parameters and standards. While this evaluation of the performance of the SCR catalyst of the OBD limit part is going on, in accordance with some embodiments of the present disclosure, the OBD system provides a diagnosis with respect to the SCR catalyst of the OBD limit part. In other words, the OBD system provides an indication of whether the SCR catalyst of the OBD limit part is functioning within the required parameters and standards or if it is no longer functioning within those required parameters and standards.

After the SCR catalyst is evaluated for performance and the diagnosis of the OBD system is collected. The evaluation of the SCR catalyst and the diagnosis by the OBD system are compared. If the diagnosis of the OBD system provides that the SCR catalyst is functioning within the proper parameters and standards, but the evaluation of the SCR catalyst indicates that the SCR catalyst is not functioning within the proper parameters and standards, the OBD system can be further calibrated so the diagnosis of the OBD system and the results of the evaluation of the SCR catalyst of the OBD limit part agree.

OBD limit parts produced in accordance with certain embodiments of the present disclosure can be produced quickly and reproducibly. These OBD limit parts are representative of real world failures of SCR catalyst systems. Embodiments of the present disclosure are useful for manufacturers of vehicles that include an OBD system for an SCR system that requires certification, as such embodiments reduce the time and expense associated with sourcing OBD limit parts for use in certifying OBD systems for SCR systems.

BRIEF DESCRIPTION OF THE SEVERAL VIEWS OF THE DRAWINGS

In the drawings, identical references numbers identify similar elements or acts unless the context indicates otherwise. The sizes and relative portion of the elements in the drawings are not necessarily drawn to scale.

DETAILED DESCRIPTION

In the following description, certain specific details are set forth in order to provide a thorough understanding of various embodiments of the disclosure. However, one skilled in the art will understand that the disclosure may be practiced without these specific details. In other instances, well-known structures associated with electronic components and fabrication techniques have not been described in detail to avoid unnecessarily obscuring the descriptions of the embodiments of the present disclosure.

Unless the context requires otherwise, throughout the specification and claims that follow, the word "comprise" and variations thereof, such as "comprises" and "comprising," are to be construed in an open, inclusive sense, that is, as "including, but not limited to."

The use of ordinals such as first, second and third does not necessarily imply a ranked sense of order, but rather may only distinguish between multiple instances of an act or structure.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

Figure 1:
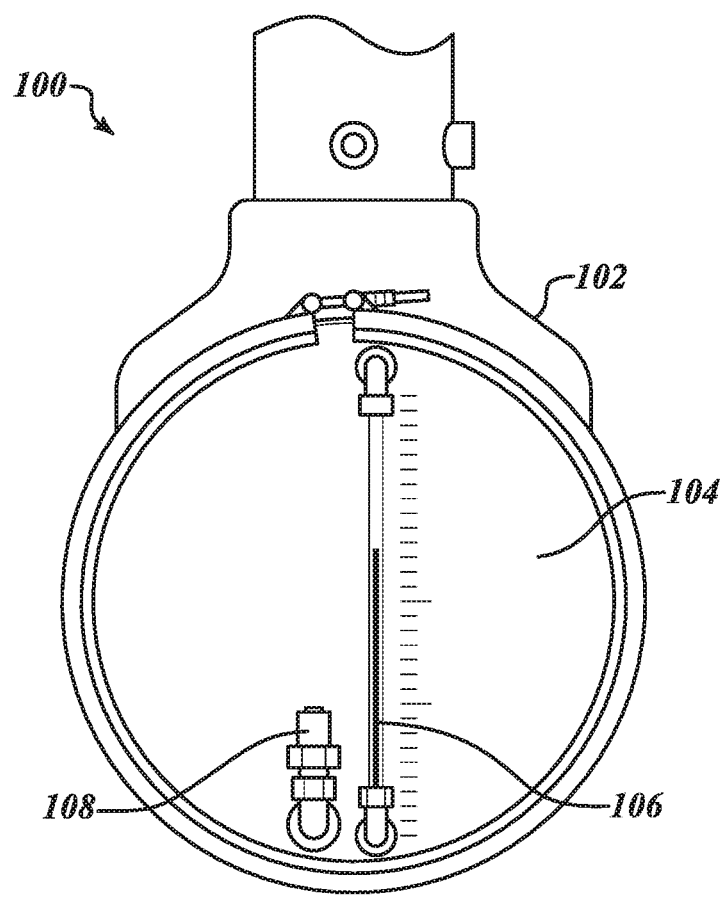
FIG. 1 is a front side view of an embodiment of a vessel with a front cover containing a Selective Catalytic Reduction (SCR) catalyst and a contaminant.

FIG. 1 illustrates a device 100 in which an OBD limit part (406 in FIG. 4) in accordance with embodiments disclosed herein are contained. Device 100 includes a closed vessel 102 that includes a cover 104. The cover 104 includes a gauge 106 for measuring an amount of liquid in vessel 102 and an inlet 108 for introducing liquid into the closed vessel 102. In accordance with embodiments of the present disclosure, vessel 102 is an actual vessel of the type that would be used to contain an SCR catalyst in an SCR system for a diesel engine; however, embodiments of the present disclosure are not limited to utilizing such an actual vessel from a diesel engine SCR system. In accordance with other embodiments, the vessel 102 is not an actual vessel from a diesel engine SCR system. In the embodiment of FIG. 1, the inlet 108 is utilized to place a controlled amount of a contaminant 110 in the vessel 102 where the contaminant 110 contacts SCR catalyst 112 contained in the vessel 102. The combination of contaminant 110 and SCR catalyst 112 contained in the vessel 102 forms an OBD limit part in accordance with the present disclosure. Gauge 106 provides an indication of how much contaminant 110 is contained in the vessel 102. As the amount of the contaminant 110 that enters the vessel 102 through the inlet 108 increases, the reading of the gauge 106 increases as well. The vessel 102 and the cover 104 enclose the contaminant 110 and the SCR catalyst 112 so the contaminant 110 and the SCR catalyst 112 cannot escape from the vessel 102.

SCR catalysts useful in accordance with embodiments of the present disclosure are made from various ceramic materials used as a carrier, such as titanium oxide, and active catalytic components which can be oxides of base metals (such as vanadium, molybdenum and tungsten), zeolites, or various precious metals. Embodiments of the present disclosure are not limited to any specific SCR catalyst chemistry.

The SCR catalyst 112 may have a plate shape, a honeycomb shape, or any other shape as desired.

Figure 2:
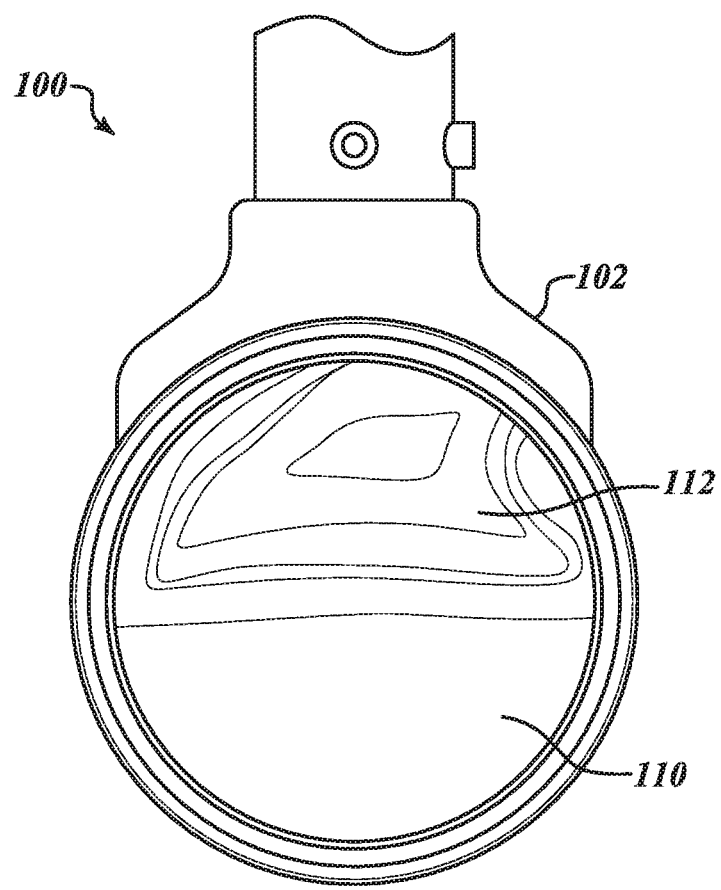
FIG. 2 is a front side view of an embodiment of the vessel of FIG. 1 with the front cover removed and replaced with a transparent cover.

FIG. 2 illustrates another embodiment of a device 100 in which an OBD limit part (406 in FIG. 4) in accordance with embodiments of the present disclosure are contained. However, unlike in FIG. 1, the cover 104 has been removed or replaced with a transparent cover for viewing inside the vessel 102. In this embodiment, the cover 104 is transparent allowing an operator to see how the contaminant 110 and the SCR Catalyst 112 mix together within vessel 102. Over time, contaminant 110 tends to accumulate in lower portions, e.g., the bottom half of the vessel 102 where it contacts SCR catalyst 112 present in lower portions of vessel 102. Portions of SCR catalyst 112 in upper portions, e.g., the top half of the vessel 102 may not be in contact with contaminant 110. In the specific embodiment illustrated in FIG. 2 contaminant 110 is present in about the lower 50% of vessel 102. However, in some embodiments, contaminant 110 is mixed in with the SCR catalyst 112 in the upper portions of the vessel 102. OBD limit parts 406 in accordance with embodiments of the present disclosure include a controlled amount of contaminant 110 equal to about 50% of the volume occupied by the SCR catalyst 112 in vessel 102. However, in other alternative embodiments, the amount of contaminant 110 introduced into vessel 102 is equal to about 75% of the volume occupied by the SCR catalyst 112 in vessel 102; is equal to about 25% of the volume occupied by the SCR catalyst 112 in vessel 102; or is equal to about 100% of the volume occupied by the SCR catalyst 112 in vessel 102; or is equal to some other percentage of the volume occupied by the SCR catalyst 112 in vessel 102. In other words, OBD limit parts in accordance with the present embodiments include any controlled amount of contaminant 110 combined with the SCR catalyst 110 to obtain any desired ratio of contaminant 110 to SCR catalyst 112. These different ratios of the SCR catalyst 112 to contaminant 110 allow for a large number of OBD limit parts 406 to be manufactured and produced so that many different real life conditions can be simulated.

In accordance with embodiments of the present disclosure, contaminant 110 may be a coolant from an exhaust gas recirculation cooling system or an engine cooling system. Examples of such types of coolants include liquids, but could also be other fluids such as a gas. The coolant 110, in use, circulates through an engine cooling system to cool the engine while it runs and/or can also be used to cool an exhaust gas recirculation system. However, in other alternative embodiments, other contaminants 110 may be utilized to produce other types of OBD limit parts 406. Examples of other contaminants 110 include a hydraulic fluid, a liquid fuel, a gaseous fuel, or other non-exhaust contaminant that should normally not be present in an EAS and would cause the SCR system, including the SCR catalyst 112, to not function properly.

Figure 3:
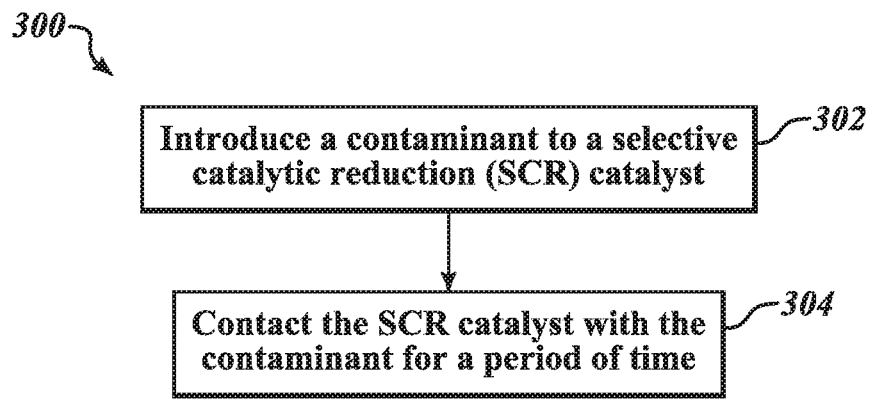
FIG. 3 is a flow chart illustrating steps of an embodiment of a method of manufacturing an OBD limit part.

FIG. 3 illustrates a flow chart setting out an embodiment of a method 300 of manufacturing an OBD limit part 406. The method 300 includes introducing a controlled amount of the contaminant 110 to the SCR catalyst 112 in a first step 302 and contacting the SCR catalyst 112 with the contaminant 110 for a preselected period of time in a second step 304. This method 300 of manufacturing the OBD limit part 406 is carried out utilizing the vessel 102 as shown in FIGS. 1 and 2.

In the first step 302, the contaminant 110 is introduced into the vessel 102 through the inlet 108. The vessel 102 already contains the SCR catalyst 112 when the contaminant 110 enters the vessel 102 through the inlet 108. As discussed earlier with respect to FIGS. 1 and 2, the amount of the contaminant 110 introduced into the vessel 102 is controlled to be a desired amount of contaminant 110.

After the contaminant 110 is introduced to the SCR catalyst 112 in the vessel 102 through the inlet 108, in the second step 304, the SCR catalyst 112 is contacted with the contaminant 110 for a preselected period of time. This preselected period of time may be of any length. The SCR catalyst 112 is soaked in the contaminant 110 for a preselected period of time in the second step 304.

One example of a preselected period of time is a period of time that is representative of a two-day weekend when a commercial truck is typically stationary and not in use, e.g., a Friday evening to a Monday morning or about 56 hours. However, in alternative embodiments, other periods of time may be preselected for contacting the contaminant with the SCR catalyst either based on a desire to replicate a real world failure situation or as desired for testing purposes of an SCR catalyst 112, an SCR catalyst of an OBD limit part 406, or an OBD system 410, which will be discussed below with respect to FIG. 6.

A benefit of manufacturing OBD limit parts 406 in accordance with embodiments described herein is that OBD limit parts 406 with a wide range of catalysts to contaminants ratios can be manufactured with a very short turnaround or lead time, e.g., OBD limit part manufacturing processes in accordance with embodiments described herein can be completed within a number of hours or days. The disclosed embodiments provide methods of manufacturing OBD limit parts that can be adapted to test the performance of a wide range of SCR catalysts 112 under a wide range of different conditions as represented by the many different levels of SCR catalyst 112 to contaminant 110 ratios.

Figure 4A:
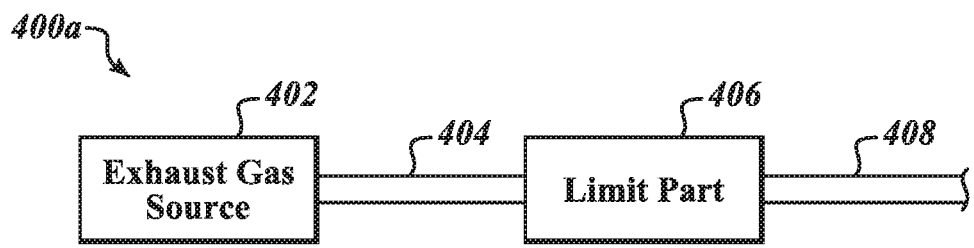
FIG. 4A is a block diagram of an exhaust gas source coupled to a limit part.

FIG. 4A illustrates a system 400a that includes an exhaust gas source 402, fluidly coupled to an OBD limit part 406 of the present disclosure by a first fluid path 404, the OBD limit part 406 (contained in a vessel), and a second fluid path 408 fluidly coupled to the OBD limit part 406.

The exhaust gas source 402 may be a diesel engine, a non-diesel engine, or some other alternative $NO_x$ exhaust emitting device, system, or source. The exhaust gas source 402 is coupled to a first end of the first fluid path 404. The first fluid path 404 has a second end that is coupled to a vessel 102 containing the OBD limit part 406. The vessel 102 containing the OBD limit part 406 is coupled to a first end of the second fluid path 408. The first fluid path 404 and the second fluid path 408 may be pipes, inlets, outlets, or some other types of devices that allow for a fluid, such as a gas to pass from one place to another through the device. The second fluid path 408 has a second end that is coupled to another EAS, an exhaust outlet, or any other component as desired within a vehicle or a truck.

In the system 400a, the exhaust gas source 402 emits an exhaust gas that passes through the first fluid path 404 from the first end to the second end where it is introduced to the OBD limit part 406. The exhaust gas may include greenhouse gases (ozone, $CO_2$, $N_2O$, $CH_4$, etc.), nitrogen oxides ($NO_x$), or some other type of exhaust gas or gases. The exhaust gas enters the vessel 102 that contains the OBD limit part 406, which is a combination of the controlled amount of contaminant 110 and the SCR catalyst 112 that has been soaked for a preselected period of time in the contaminant 110. As the exhaust gas enters the vessel 102 that contains the OBD limit part 406 and comes into contact with the SCR catalyst 112 of the OBD limit part 406 in the vessel 102, the SCR catalyst 112 reacts with the components of the exhaust gas to reduce the emission of undesirable gases from the exhaust gas source. In one embodiment, the SCR catalyst 112 reduces the amount of nitrogen oxides ($NO_x$) in the exhaust emissions. In this one embodiment, the contaminated SCR catalyst 112 converts the nitrogen oxides ($NO_x$) into diatomic nitrogen ($N_2$) and water ($H_2O$). In other alternative embodiments, the SCR catalyst 112 reacts with the exhaust gas to remove other types of unwanted emissions from the exhaust gas. After the exhaust gas has reacted with the SCR catalyst 112 in the vessel 102, the processed exhaust gas exits the vessel 102 through the second fluid path 408. The second fluid path 408 may lead to an exhaust vent or other emissions processing components within the vehicle or truck.

Figure 4B:
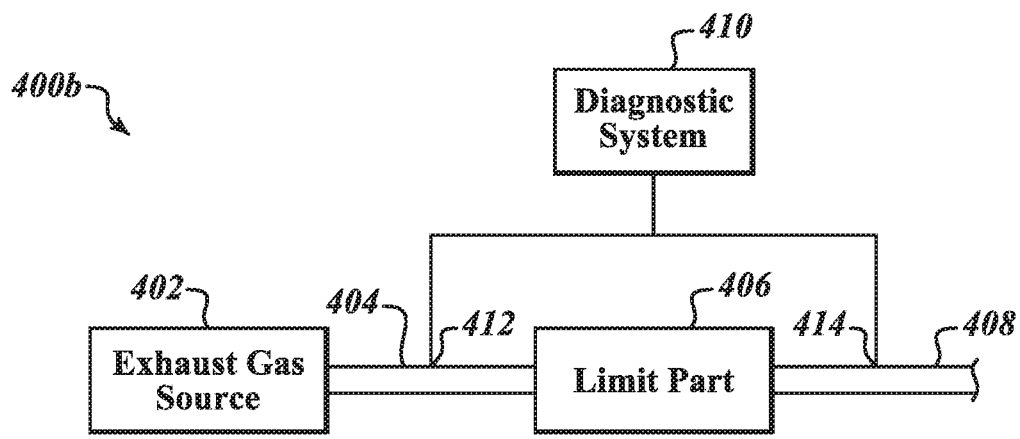
FIG. 4B is a block diagram of the exhaust gas source coupled to the limit part and a diagnostic system coupled to the exhaust gas source and the limit part.

FIG. 4B is directed to a system 400b similar to the system 400a as discussed above with respect to FIG. 4A. However, unlike the system 400a in FIG. 4A, the system 400b in FIG. 4B also includes a diagnostic system 410 coupled to the first fluid path 404 and the second fluid path 408.

The diagnostic system 410 is coupled to the first fluid path 404 at a first location 412 and is coupled to the second fluid path 408 at a second location 414. The first location 412 is located between the exhaust gas source 402 and the OBD limit part 406. The second location 414 is located at a position after the OBD limit part 406. The diagnostic system 410 includes a first sensor at the first location 412 and a second sensor at the second location 414. The first sensor and the second sensor detect the amounts of nitrogen oxides ($NO_x$) present in the exhaust gas as the exhaust gas passes through the first fluid path 404 and the second fluid path 408. However, in other alternative embodiments, the first sensor and the second sensor of the diagnostic system 410 may detect an amount of greenhouse gases or some other portion of the composition of the exhaust gas as the exhaust gas passes through the first fluid path 404 and the second fluid path 408. In this embodiment the diagnostic system 410 is an on-board diagnostic (OBD) system 410. In this embodiment, the OBD system 410 is a system for use on-board a vehicle or truck and provides a diagnosis on how an SCR catalyst system of the vehicle is functioning.

For the purposes of this discussion, the OBD system 410 will be discussed with respect to detecting nitrogen oxides ($NO_x$). However, as discussed earlier, any number of types of gases or fluids can be detected by the OBD system 410 as desired. In this embodiment, the OBD system 410 detects a first amount of nitrogen oxides ($NO_x$) at the first location 412 and a second amount of nitrogen oxides ($NO_x$) at the second location 414. The first amount is an amount of nitrogen oxides ($NO_x$) before the exhaust gas has been treated by the OBD limit part 406 and the second amount of nitrogen oxides ($NO_x$) is an amount of nitrogen oxides ($NO_x$) after the exhaust gas has been treated by the OBD limit part 406. In other words, the first amount of nitrogen oxides ($NO_x$) is the amount of nitrogen oxides ($NO_x$) that enters the vessel 102 containing the OBD limit part 406 and the second amount of nitrogen oxides ($NO_x$) is the amount of nitrogen oxides ($NO_x$) left in the exhaust gas after the exhaust gas has been treated by the OBD limit part 406 present in the vessel 102.

The first amount of nitrogen oxides ($NO_x$) and the second amount of nitrogen oxides ($NO_x$) are used to calculate a Conversion Inefficiency (CIE) percentage which, in accordance with embodiments of the present disclosure, is utilized by an OBD diagnostic system 410 to evaluate the effectiveness of the SCR catalyst 112. The CIE % is representative of how efficient the SCR catalyst 112 is at removing or reducing nitrogen oxides ($NO_x$) from the exhaust gas. The equation for calculating the CIE % is as follows:

$$CIE\% = 100 * \left( \frac{SCR \text{ out } NO_x}{SCR \text{ in } NO_x} \right)$$

In the equation above, SCR out $NO_x$ refers the amount of $NO_x$ at location 414 and SCR in $NO_x$ refers to the amount of $NO_x$ at first location 412. This CIE % is used by an OBD diagnostic system to determine whether an SCR catalyst, is working within the proper parameters and standards. The parameters, standards, and the process the OBD system 410 goes through to use the CIE % in evaluating an SCR catalyst will be discussed below. The description of the present embodiments proceed with reference to CIE % as an example of data related to $NO_x$ in an exhaust gas; however, embodiments of the present disclosure may use other data related to $NO_x$ in an exhaust gas.

Figure 5:
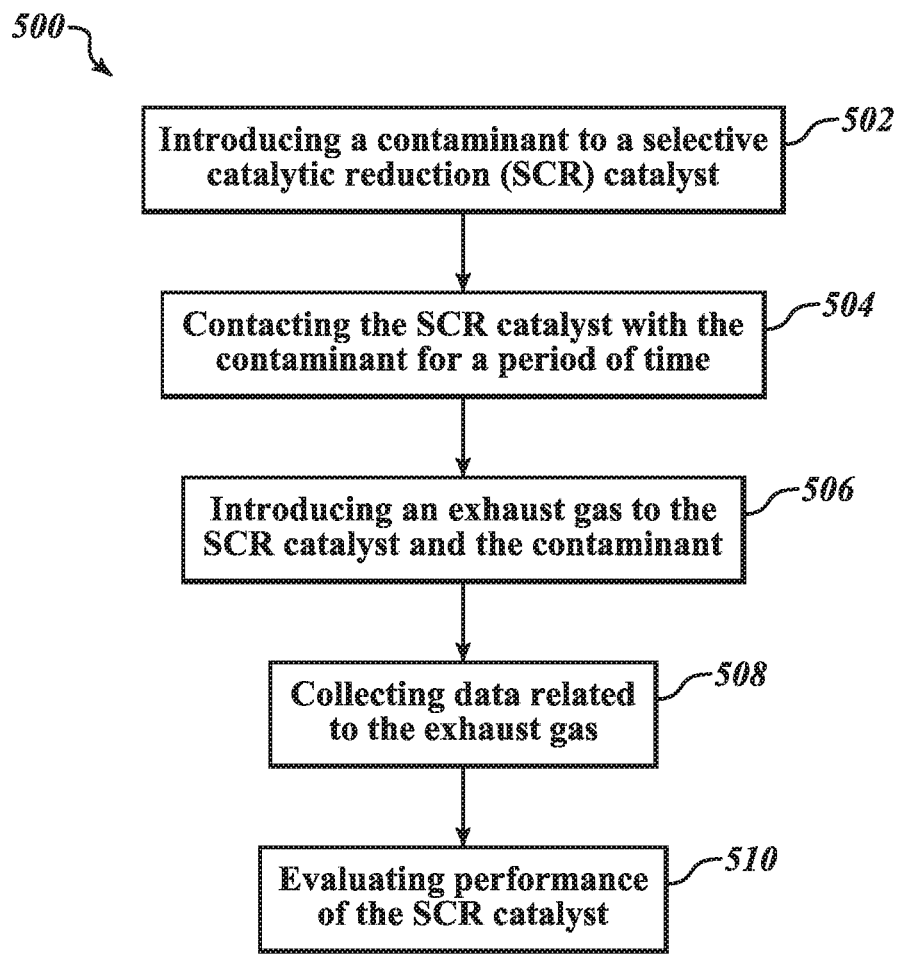
FIG. 5 is a flow chart of an embodiment of a method of evaluating performance of a SCR catalyst or an OBD limit part.

FIG. 5 is directed to an embodiment of a method 500 of evaluating an SCR catalyst 112 for its ability to reduce the amount of $NO_x$ or the amount of other components in an exhaust gas from an internal combustion engine. In accordance with this method of evaluation, an OBD limit part 406 is manufactured through the introduction of a controlled amount of contaminant 110 to an SCR catalyst 112 in a first step 502, and contacting the SCR catalyst 112 with the controlled amount of contaminant 110 for a preselected period of time in a second step 504. In third step 506, an exhaust gas from an internal combustion engine is introduced to the OBD limit part 406 using one of the systems 400a, 400b described above with reference to FIGS. 4A and 4B. After the introduction of an exhaust gas in the third step 506, data related to the exhaust gas is collected in a fourth step 508. The data collected in the fourth step 508 includes data related to the exhaust gas before and after the exhaust gas has been introduced to the SCR catalyst 112 and the contaminant 110 contained in the vessel 102, otherwise known as the OBD limit part 406. In accordance with this disclosed embodiment, first data is collected related to the exhaust gas before the exhaust gas enters the vessel 102 that contains the SCR catalyst 112 and the contaminant 110. Similarly, second data is collected related to the exhaust gas that has exited the vessel 102 containing the SCR catalyst 112 and contaminant 110 in the vessel 102. The first data and the second data may be a composition of the exhaust gas, an amount of a specific component of the exhaust gas, or any other data related to the exhaust gas. An example of the first data includes the $NO_x$ content of the exhaust gas before contacting the SCR catalyst 112 and contaminant 110 in vessel 102. An example of the second data includes the $NO_x$ content of the exhaust gas after contacting the SCR catalyst 112 and contaminant 110 in vessel 102. After the first data and the second data related to the exhaust gas have been collected in the fourth step 508, the performance of the SCR catalyst 112 is evaluated in a fifth step 510. In the fifth step 510, the first data and the second data are compared to evaluate whether the contaminated SCR catalyst 112 is working within proper parameters and standards. These parameters and standards may be industry standards, governmental standards, or any other standards or required parameters related to emissions from an internal combustion engine, such as a diesel-fueled internal combustion engine to be used in a truck or vehicle. Examples of such standards and parameters include standards set by the California Air Resources Board (CARB), the Environmental Protection Agency (EPA), or other local, state, or federal government agencies. In other embodiments, the standards and parameters include standards and parameters set by other countries. The following description of embodiments of the present disclosure refers to the CARB standards; however, the present disclosure is not limited to embodiments directed at meeting the CARB standards.

Figure 6:
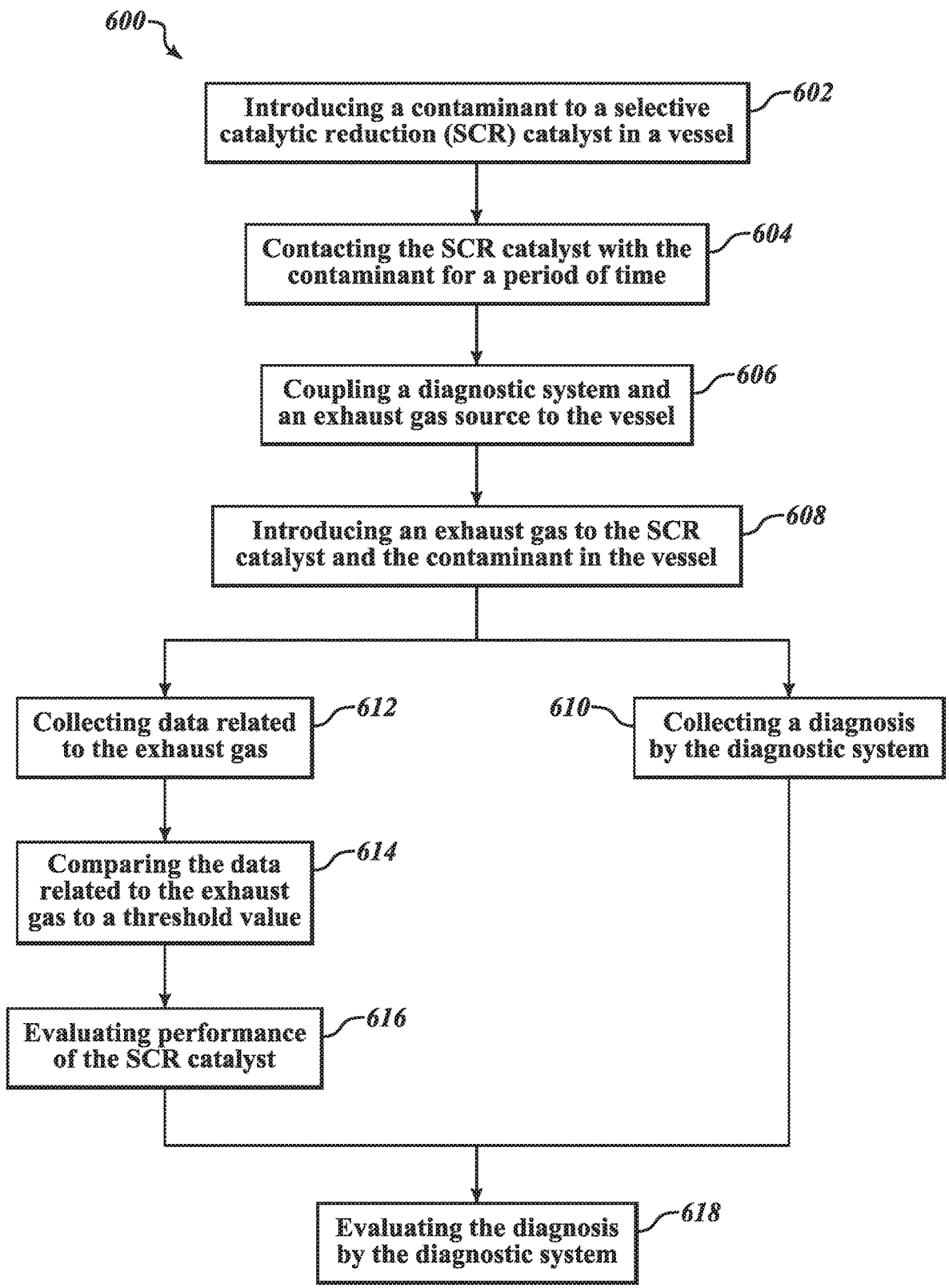
FIG. 6 is a flow chart of an embodiment of a method for evaluating a diagnosis by an OBD system for an SCR catalyst system.

FIG. 6 is directed to a method 600 of testing and evaluating an OBD system 410 for an SCR system. The system 400b as shown in FIG. 4B is an example of an embodiment that can be utilized to conduct and perform this method 600 to evaluate an OBD system 410 for an SCR system.

Similar to the method of manufacturing 300 the OBD limit part 406 discussed above with respect to FIG. 3, in the method 600 of FIG. 6 an OBD limit part 406 is manufactured through introducing of a controlled amount of contaminant 110 to an SCR catalyst 112 in a first step 602 and contacting the SCR catalyst 112 with the contaminant 110 for a preselected period of time in a second step 604. In third step 606, OBD system 410 is coupled to the first fluid path (404 in FIG. 4) and the second fluid path (408 in FIG. 4) that are in fluid communication with the vessel 102 containing the SCR catalyst 112 and the contaminant 110 comprising the OBD limit part 406. In other words, the third step 606 results in the system 400b as shown in FIG. 4B. The OBD system 410 has a first sensor that is coupled to the first fluid path 404 at the first location (412 in FIG. 4) and a second sensor that is coupled to the second fluid path 408 at the second location (414 in FIG. 4). In accordance with this embodiment, an exhaust gas is introduced to the SCR catalyst 112 and contaminant in the vessel 102 in a fourth step 608. The fourth step 608 of introducing the exhaust gas to the SCR catalyst 112 and contaminant 110 in the vessel 102 is similar to introducing the exhaust gas to the SCR catalyst 112 and contaminant 110 in the vessel 102 described above with reference to step 506 in FIG. 5.

In step fifth 610, a diagnosis of the performance of the SCR catalyst 112 and contaminant 110 in vessel 102 is performed by the OBD system 410 which has been calibrated to detect non-compliance with applicable parameters. The OBD system 410 provides an indication of whether the SCR catalyst 112 is working within the proper parameters and standards. These parameters and standards are the same as those discussed earlier with respect to FIG. 5. The indication by the OBD system 410 is recorded to be compared with the evaluation of a performance of the contaminated SCR catalyst 112 in an eighth step 616.

A sixth step 612 of collecting data occurs before and after the exhaust gas has been introduced to the SCR catalyst 112 and the contaminant 110 contained in the vessel 102, otherwise known as the OBD limit part 406. First data is collected related to the exhaust gas before the exhaust gas enters the vessel 102 that contains the SCR catalyst 112 and the contaminant 110. Similarly, second data is collected related to the exhaust gas after the exhaust gas leaves the vessel 102 and has reacted with the contaminated SCR catalyst 112 in the vessel 102. The first data and the second data may be the composition of the exhaust gas, the amount of a specific part of the exhaust gas, a percentage of a specific part of the exhaust gas, or any other data related to the exhaust gas may be collected. After the first data and the second data related to the exhaust gas have been collected in the sixth step 612, the second data is compared to a threshold value in a seventh step 614. After the comparison of the data to the threshold value in the seventh step 614, the contaminated SCR catalyst 112 is evaluated in the eighth step 616. If the data from step 612 exceeds the threshold value then the SCR catalyst 112 is determined to not be functioning within the proper parameters and standards. These parameters and standards are the same as those discussed earlier with respect to FIG. 5.

In a ninth step 618, the diagnosis by the OBD system 410 is evaluated against the evaluation of the performance of the SCR catalyst 112 determined from step 616. If it is determined through the sixth step 612, the seventh step 614, and the eighth step 616 that the SCR catalyst 112 is not functioning within the proper parameters and standards, but the diagnosis by the OBD system 410 indicates that the SCR catalyst 112 is functioning within the proper parameters and standards, then the diagnosis by the OBD system 410 does not reflect the real world performance of the SCR catalyst, indicating a need to recalibrate the OBD system 410. On the other hand, if the evaluation of the performance of the SCR catalyst 112 in the sixth, seventh, and eighth steps 612, 614, 616 agrees with the diagnosis of the OBD system 410, then the OBD system 410 is providing an accurate diagnosis of the SCR catalyst 112 functioning properly.

A benefit of method 600 of testing and evaluating an OBD system 410 utilizing the OBD limit part 406 that is produced in accordance with embodiments of the present disclosure is that the OBD limit part 406 is representative of a real world failure. Utilizing an OBD limit part that is representative of a real world failure means the likelihood of a mistaken or wrong diagnosis by the OBD system 410 is reduced. If the method of testing and evaluating 600 identifies a mismatch between the diagnosis by the OBD system 410 and the performance of the SCR catalyst 112, changes to the OBD system 410 can made to avoid the mismatch between the diagnosis by the OBD system 410 and the performance of the SCR catalyst 112.

By manufacturing OBD limit parts 406 with the above discussed methods of FIGS. 3, 5, and 6, the OBD limit parts 406 can be manufactured with a very short turnaround or lead time, the OBD limit parts 406 can be reproduced with reliably, and the OBD limit parts 406 yield repeatable and consistent results when testing the OBD limit parts 406 and the OBD system 410. For at least these reasons, OBD limit parts 406 manufactured using the above methods and processes are advantageous over the method of manufacturing limit parts described in U.S. Pat. No. 9,528,420.

When the two OBD limit parts 406 were manufactured to be nearly identical, and these OBD limit parts 406 were used to evaluate the performance of an OBD system, the OBD system recorded nearly identical CIE % distributions and nearly identical emissions data when the two OBD limit parts 406 were used to evaluate the OBD system 410 under a Federal Test Protocol (FTP) Emissions cycle (a federally mandated emissions certification and fuel economy test) for heavy duty vehicles and a Ramped Mode Cycle (RMC). The RMC emissions data for both limit parts 406 was nearly identical. The FTP emissions data for both of the OBD limit parts 406 was nearly identical and the RMC emissions data for both of the OBD limit parts 406 was nearly identical. The CIE % distributions calculated using the RMC emissions data was nearly identical for both of the OBD limit parts 406.

Before an OBD system is tested or used in a truck or vehicle, the OBD system 410 is calibrated using a baseline part. The baseline part may comprise an SCR catalyst 112 in brand new condition without any contaminant 110 introduced to the SCR catalyst 112. The baseline part is a brand new SCR catalyst 112 part that would be utilized in a new vehicle or a new truck. The OBD system is then tested and calibrated using this baseline part and the method 600 in FIG. 6, or another similar such method to calibrate the OBD system 410. The baseline part and the OBD system 410 are run under the FTP emissions cycle and the RMC. The RMC data is used to determine a baseline CIE % distribution for the baseline part. The baseline CIE % distribution is then used by the OBD system 410 as a baseline distribution or value to determine and evaluate when an SCR catalyst 112 is failing and not working within certain standards and parameters. The baseline CIE % distribution is compared to CIE % distributions determined by the OBD system 410 when the OBD system 410 is tested using the OBD limit parts 406 to determine whether the OBD system 410 will provide an indication that is correct or incorrect under real world situations.

The RMC CIE % distribution of the baseline part is a baseline value to be utilized by the OBD system to determine when an SCR catalyst is failing and not working within certain standards or parameters. The OBD system makes an evaluation of whether an SCR catalyst the performance of which the OBD system is monitoring is functioning within the standards or parameters by comparing the RMC CIE % distribution of the SCR catalyst to the RMC CIE % distribution of the baseline part. In other words, the OBD system is calibrated using the data of the RMC CIE % distribution of the baseline part, and the baseline part is a calibration part used to calibrate the OBD system.

The OBD system 410 provides an appropriate indication when (1) the FTP emissions data, the RMC emissions data, or both exceed a threshold emissions value and (2) the OBD system provides an indication that the SCR catalyst 112 should be replaced.

The OBD system 410 provides an inappropriate indication when (1) the FTP emissions data, the RMC emissions data, or both exceed the threshold emissions value and (2) the OBD system provides an indication that the SCR catalyst 112 should not be replaced or does not indicate the SCR catalyst should be replaced. This indication or lack of indication by the OBD system 410 is inappropriate because the FTP emissions data, RMC emissions data, or both show the SCR catalyst 112 is not functioning within the threshold emissions value, but the OBD system 410 still provides an inappropriate indication that the SCR catalyst is functioning within the threshold emissions value, when in actuality the SCR catalyst is not functioning within the threshold emission value. This means that the OBD system would indicate that the SCR catalyst 112 is functioning properly when in actuality the SCR catalyst 112 is not functioning properly. This inappropriate indication results in an operator or a maintenance provider believing that the SCR catalyst 112 is still functioning properly when the SCR catalyst 112 is actually no longer functioning properly. When the emissions data and the indication by the OBD system do not provide the same conclusion there is a "mismatch" between the output of the OBD system and the emissions data.

A mismatch indication by the OBD system is when both the FTP emissions data and the RMC emissions data are below a threshold emissions value and the OBD system provides an indication that the SCR catalyst 112 should be replaced. This mismatch indication is more acceptable than the mismatch indication described in the previous paragraph because it may result in the SCR catalyst 112 being replaced early, but not exceeding emissions standards. This is a mismatch indication because while in actuality the SCR catalyst 112 is functioning properly, the OBD system indicates the SCR catalyst 112 should be replaced. While, this mismatch indication by the OBD system is more tolerable compared to the inappropriate indication discussed above it is still be preferred to avoid all mismatch and inappropriate indications by the OBD system. The data collected during the RMC emissions test is used to calculate the CIE % distributions for the baseline part and the OBD limit parts 406. This mismatch indication the SCR catalyst 112 is functioning properly may also occur when the OBD system 410 provides a warning that the SCR catalyst 112 may be nearing the end of its useful life but the SCR catalyst 112 is functioning properly.

The OBD system 410 may be programmed to provide indications in addition to whether an SCR catalyst 112 needs to be replaced or not. The OBD system may be programmed to provide an indication that the SCR catalyst 112 may be reaching the end of its life, the SCR catalyst 112 needs to be further tested to determine whether it needs to be replaced, or any other indication as required or desired by a user of the vehicle or truck. These indications may be programmed to be provided by the OBD system 410 when the CIE % distribution data falls within certain ranges of threshold values, when the RMC emissions data falls within certain ranges of threshold values, when the FTP Cycle emissions data falls within certain ranges of threshold values, or any other set of data falling within certain ranges of threshold values. These ranges of threshold values may be predetermined by a standard, a user, a regulatory entity, a governmental entity, or any other threshold values as desired or required.

When using the OBD limit parts 406 to test the OBD system 410, large differences between the CIE % distribution of the baseline part and the CIE % distribution of an OBD limit part are desirable. This difference between the RMC CIE % distribution value of the baseline part and the RMC CIE % distribution values of the various test samples will be known as "separation." Greater separation is desirable because if the separation is too small then a mismatch between the indication by the OBD system and the actual functionality of the SCR catalyst can result as discussed above. The large separation between these CIE % distributions is desirable because when there is greater separation there is a much lesser chance of the OBD system providing an incorrect or inappropriate indication or mismatch as discussed above. There is lesser chance of an incorrect indication or mismatch because the greater separation between the baseline CIE % distribution and the OBD limit part 406 CIE % distribution allows the OBD system to more precisely diagnose or determine whether an SCR catalyst 112 or OBD limit part 406 is working within a standard or is not working within a standard. In other words, this greater separation reduces the likelihood of mismatches between the indication by the OBD system 410 and how the SCR catalyst 112 is actually functioning when in use in the real world because the CIE % distributions are more easily comparable due to the greater separation. This reduces the likelihood of having a mismatch occur. The standard or parameters may be any number of threshold values or ranges as desired and discussed above.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for evaluating an ability of a selective catalytic reduction (SCR) system to convert NOx to nitrogen and water, the method comprising:
   introducing a controlled amount of exhaust gas recirculation system coolant into a vessel containing a SCR catalyst;
   contacting the SCR catalyst contained in the vessel with the exhaust gas recirculation system coolant for a period of time;
   introducing an exhaust gas from a diesel engine into the vessel containing the SCR catalyst and the exhaust gas recirculation system coolant;
   collecting first data related to NOx in the exhaust gas prior to introducing the exhaust gas into the vessel containing the SCR catalyst and the exhaust gas recirculation system coolant;
   collecting second data related to NOx in the exhaust gas after the exhaust gas has passed through the vessel containing the SCR catalyst and the exhaust gas recirculation system coolant;
   comparing the second data to a threshold standard; and
   evaluating operation of the SCR system based on a result of the comparison of the second data to the threshold standard.

2. The method of claim 1, further comprising coupling a diagnostic system to the vessel containing the exhaust gas recirculation system coolant and the SCR catalyst.

3. The method of claim 2, further comprising:
   determining a Conversion In-Efficiency percentage (CIE %) distribution using the first data and the second data;
   collecting an indication from the diagnostic system, the indication based on a comparison of the CIE % distribution and the threshold standard; and
   evaluating the diagnostic system by comparing the indication from the diagnostic system to the evaluation of the operation of the SCR system.

4. The method of claim 1, wherein the threshold standard used to evaluate operation of the SCR system is 0.4 g/bhp-hr of NOx.

5. The method of claim 1, wherein contacting the SCR catalyst contained in the vessel with a controlled amount of the exhaust gas recirculation system coolant for the period of time includes contacting the SCR catalyst with the controlled amount of the exhaust gas recirculation system coolant for a preselected period of time.

6. The method of claim 5, wherein the controlled amount of the exhaust gas recirculation system coolant is a percentage of a volume of the SCR catalyst contained in the vessel.

7. The method of claim 1, wherein introducing the exhaust gas from the diesel engine into the vessel containing the SCR catalyst and the exhaust gas recirculation system coolant includes introducing the exhaust gas through an emissions test cycle.

8. The method of claim 1, wherein introducing the exhaust gas from the diesel engine into the vessel containing the SCR catalyst and the exhaust gas recirculation system coolant includes introducing the exhaust gas through a two-ramped mode cycle.

* * * * *